United States Patent [19]
Massano et al.

[11] Patent Number: 5,391,860
[45] Date of Patent: Feb. 21, 1995

[54] TEMPERATURE-CONTROLLING METHOD, FOR EXAMPLE IN SYSTEMS FOR INJECTION OF PLASTICS MATERIALS, AND RESPECTIVE SYSTEM

[75] Inventors: Modesto Massano, Mathi Canavese; Vincenzo Commisso, Volpiano, both of Italy

[73] Assignee: Plasthing Elettronica S.n.c. Di Massano Modesto E Commisso Vincenzo, Torino, Italy

[21] Appl. No.: 981,817

[22] Filed: Nov. 25, 1992

[30] Foreign Application Priority Data

Sep. 15, 1992 [EP] European Pat. Off. ......... 92830486.4

[51] Int. Cl.$^6$ ............................................. H05B 1/02
[52] U.S. Cl. ...................................... 219/497; 219/494; 219/506; 364/557; 432/36
[58] Field of Search ............... 219/491, 497, 494, 499, 219/501, 506; 364/477, 557; 432/36, 49

[56] References Cited

U.S. PATENT DOCUMENTS

| | | | |
|---|---|---|---|
| 4,614,860 | 9/1986 | Kativois | 219/492 |
| 4,845,341 | 7/1989 | Rae | 219/497 |
| 5,090,305 | 2/1992 | Lehman | 99/330 |
| 5,216,226 | 6/1993 | Miyoshi | 219/497 |
| 5,221,916 | 6/1993 | McQueen | 338/24 |

FOREIGN PATENT DOCUMENTS 58-185237  10/1983  Japan .
3009826   1/1991  Japan .

OTHER PUBLICATIONS

"Patent Abstracts of Japan," vol. 15, No. 120 (M-1096) (4648) Mar. 25, 1991.
"Patent Abstracts of Japan," vol. 8, No. 26 (M-273) (1463) Feb. 3, 1984.
Gustafson et al, "Model Predictive Control (MPC) of Injection Machines," *Proceedings of the 26th IEEE Conference on Decision and Control*, vol. 3, Dec. 1987, pp. 2017–2026.

*Primary Examiner*—Mark H. Paschall
*Attorney, Agent, or Firm*—Edward D. Manzo

[57] ABSTRACT

A method for controlling the temperature, for example in an injector of a thermoplastics injection system which uses a closed-loop servocontrol system in which the electrical heating resistor (R) is periodically deactivated for short periods of time (Vc, Vr) in order to extrapolate the actual temperature (Tpl) of the plastics (P) in the injector, in order to control it as accurately as possible and to reset the parameters of the closed-loop servocontrol system.

33 Claims, 3 Drawing Sheets

TEMPERATURE-CONTROLLING METHOD, FOR EXAMPLE IN SYSTEMS FOR INJECTION OF PLASTICS MATERIALS, AND RESPECTIVE SYSTEM

FIELD OF THE INVENTION

The present invention relates in general to the problem of controlling the temperature of a material in a system comprising means for heating the material. The invention has been developed with particular reference to use in systems for injecting plastics materials, and in particular in order to control the temperature of plastics material processed in systems of this type.

It will be appreciated that particular reference to this application, to which the present description refers primarily and preferentially, should not be considered in any way limiting, since the scope and field of application of the invention is altogether general.

As is known, the method of injection moulding of plastics materials consists substantially of softening the material by the effect of heat and/or mechanical working in a piston or a punching-screw-type cylinder, and of very fast insertion by means of high pressure, through injectors, into a closed mould maintained at a constant temperature. The method is applied mainly to thermoplastics materials, which are solidified in the mould by the effect of cooling.

DESCRIPTION OF THE KNOWN ART

A typical injection system comprises a punching-screw plasticator unit in which the granulated plastics material is softened by the effect of heat provided by electrical heating resistors and by the pressure exerted. The plasticator unit is connected by means of supply ducts to injectors. The injectors are connected in turn to recesses in the moulds, designed to form the various parts in this plastics material.

The plastics material which fills the supply ducts and the injectors, is heated in the mould until the injection temperature is reached. At this point it is possible to carry out the injection, which is produced by high pressure exerted by the plasticator unit. The pressures reached during the injection stage are very high, for example greater than 1000 Kg/cm$^2$, and thus the injection stage is very fast; the temperatures are approximately a few hundred degrees, and are typically between 150° and 420°.

The temperature of the plastics material is particularly important for the moulding process. The injection systems therefore have systems for controlling the temperature in the plasticator unit, in the supply ducts, and in the injectors. The moulds also have piping or recesses for circulation of water or oil for cooling or heating the recesses of the moulds. The temperature of the moulds must be controlled according to the type of processing or material, in order to obtain the best results.

However for various reasons, controlling the temperature is particularly important in injectors.

FIG. 1 shows schematically an injector and the respective system for controlling the temperature. The injector, shown as a partial cross-section, comprises a body 1 having an inner cylindrical chamber. At one end thereof 3, which is intended to be connected to the mould, the body 1 is tapered. The cylindrical recess is also tapered correspondingly and ends in a very small injection hole 5 through which the plastics material is injected into the mould. The plastics material is instead however supplied to the opposite end of the cylindrical chamber. Inside the cylindrical chamber there is a component 2 which is also cylindrical, and is commonly known as the "torpedo". The cylindrical chamber and the torpedo 2 thus delimit a narrow annular recess. The torpedo itself has a tapered conical point 4 ending very close to the injection hole 5.

The torpedo is hollow inside and contains a heating resistor R. The plastics material P inside the injector fills entirely the annular recess surrounding the torpedo 2, which thus heats along the entire length of the injector almost as far as the injection hole 5.

The control system or unit S which is intended to control the temperature of the injector, comprises three main modules. The first module PC is a processing module, and typically comprises a microprocessor having means of communication with a human operator, such as a monitor, keyboard and printer. In the present state of the art this processing module PC almost always takes the form of a personal computer.

The second module is an interfacing module I. The purpose of this module is to manage communications between the processing module PC and the injection system. The interfacing module I is thus responsible for acquiring all the signals which originate from the system, such as for example the signals from a thermocouple, for converting them into digital form and transmitting them to the processing module PC. The processing module I is also responsible for receiving the commands transmitted by the processing module PC and for converting them into control signals for an actuator module A.

The actuator module A is the third module of the unit S, and comprises the circuits for controlling the injection system, for example an electronic power circuit to supply the heating resistor R by means of which the power supplied to the resistor R is regulated.

Although FIG. 1 shows only a single injector, typically the control unit S manages a plurality of injectors simultaneously, and optionally acquires further operating parameters from the injection system.

According to a known solution, the temperature is controlled by means of a closed-loop servocontrol system which varies the power supplied to the electrical heating resistor R. It will be appreciated that in order to be able to carry out closed-loop servocontrol a temperature must be measured. This measurement is carried out by means of a thermocouple TCP inserted inside the torpedo 2 or optionally in the wall 1 of the cylindrical injector chamber. The thermocouple TCP can for example be inserted in the resistor R, along the entire length of the latter (in FIG. 1 the reference TCP indicates the resistor R, inside which the thermocouple is accommodated).

The system described substantially performs a conventional closed loop-type control function, as shown in FIG. 2.

As the initial step the user selects an optimum temperature Trif which a control units will attempt to maintain when processing takes place.

The unit S receives as input the temperature Tmis measured by the thermocouple TCP (or by equivalent sensors) inside the torpedo 2 or the body 1 of the injector. The unit S then regulates continuously the power distributed to the resistor R in order to attempt to cancel the difference between the two temperatures: the temperature set, Trif, and the temperature measured, Tmis. The unit S typically comprises substantially a microprocessor which, in most cases, uses a PID algorithm well known in the art.

This method gives rise to a series of technical disadvantages since, as already said, controlling the temperature in the injectors is particularly critical.

In fact although the temperature of the plastics is controlled in the plasticator unit, and eventually in the supply duct, quite easily owing to the lapse mass and the consistent thermal inertia this does not take place for the injectors. The quantity of molten plastics contained in an injector is actually small, and additionally the injector is subjected to far greater thermal shocks than the remainder of the injection system is.

The thermal shocks are caused by the fact that during the moulding process, the injector is in contact with the moulds, which as already said, may be heated or cooled according to the processing operations. The injectors are thus subjected to rapid, substantial temperature variations.

In systems according to the known art, control of the temperature of the plastics in the injector is far from being satisfactory. In these systems, considerable differences are found between the temperature Trif set on the control unit S, and the actual temperature measured experimentally in the molten plastics P inside the injector (hereinafter known as Tpl).

This difference is owing to the fact that the temperature Tmis measured by the regulating system is not the actual temperature Tpl of the plastics P, but the temperature of the thermocouple TCP, which as already said is inserted inside the torpedo 2. The servocontrol system thus does not take into account the thermal gradient which exists between the measuring point inside the torpedo 2 and the plastics material P. In some cases in systems according to The known art, this gradient is compensated, but only approximately.

However, more serious disadvantages arise in the case of sudden temperature variations brought about by the aforementioned external causes. In these cases the control unit S reacts quickly in order to reset the optimum temperature, and since both the heating resistor R and the thermocouple TCP are inside the torpedo 2 which is made of metal and has low thermal inertia, the temperature of the torpedo is quickly restored to the required value, after which the power distributed to the resistor is reduced considerably. For this reason, since the thermal inertia of the plastics is high in comparison with the torpedo, the temperature in the plastics takes considerable time to return to the optimum value. The temperature in the plastics thus differs substantially from the value set, in particular during these transient states.

It can be seen that in practice, for a temperature set of for example 200°, the actual temperature in the plastics is 20° or 30° lower; during the transient states, such as for example when starting up the injection system, the actual temperature inside the plastics can be as much as 100° lower than the temperature set.

Owing to these shortcomings of the temperature-controlling method, the operator in charge of the injection system control must manage operation of the system on the basis of approximative, empirical methods, making extensive use of his own experience and sensitivity. Operation of the system thus relies to a large extent on the expertise of the operator, and cannot be managed accurately and automatically.

The said shortcomings of the temperature-controlling method give rise to many disadvantages in the moulding stage. A first disadvantage is derived from the plastics used in modern moulding methods. Components are currently stamped using thermoplastics and technopolymer materials, which are extremely sensitive to temperatures. In order to avoid any problems, very accurate control of the injection temperature is thus required.

Some materials may "burn" or deteriorate when subjected to temperatures which are even only a few degrees higher than the optimum levels. In the case of temperatures lower than the optimum level, some materials do not become viscous enough to enable injection to take place, and other materials can only withstand the optimum injection temperature for limited periods of time. In all cases faulty parts may be produced, owing to failure to fill the recesses, deterioration of the material, or blockage of the injectors caused by burnt or cold plastics material.

Blockage of the injectors is a very serious problem since currently, moulds having a plurality of injection points are typically used.

If a pressure imbalance occurs in the injectors, the high injection pressures give rise to an unsatisfactory result in the moulding operation, since the mould recesses are not filled correctly owing to the fact that the injectors begin to inject at different times, and the quality of the individual products is thus unacceptable. In the worst of cases, in other words when the difference between the times of starting (the injection) in the injectors is so great that some injectors are virtually blocked whereas others are functioning and therefore injecting material into the mould, the difference between pressures in the various recesses (whether joined together or individual) in the mould, may even damage the mould.

If an injector is not accurately thermoregulated, it can easily become blocked owing to the pressure and speed at which the injection stage takes place. In fact when the injection stage begins, the pressure rises quickly, and after resisting initially, the injectors start to inject the plastics material into the mould. If one of the injectors is colder than the others, and is more resistant as a result of the higher level of viscosity, injection by this injector may begin later than that by the other injectors, thus giving rise to all the above-described disadvantages.

This problem is particularly noticeable when the system is being started up, since the injectors have to make the transition from cold to the optimum temperature of use. During this operation, in systems according to the known art, the injection can thus easily begin when some of the injectors are still cold, or on the other hand, in an attempt to reach the optimum temperature, the temperature inside the injectors can be increased excessively, according to a phenomenon commonly known as "overshoot", causing the plastics inside the injectors to deteriorate.

As a result of the above-described disadvantages, when working with temperature-sensitive materials, there is an increase in the number of faulty parts, scrap, processing times and breakdowns, with a consequent considerable increase in the production costs.

OBJECT AND DESCRIPTION OF THE INVENTION

The object of the present invention is to provide a method for optimum temperature control in systems for processing a material, by this means overcoming all the disadvantages of the known art. The invention has been developed with particular reference to systems for processing plastics materials, however its area of application is much broader and is not limited to systems of this type. The said object is achieved by means of a method having the features described in the attached claims.

The object of the invention is also an operative system according to this method.

DETAILED DESCRIPTION OF THE INVENTION

Figure 1:
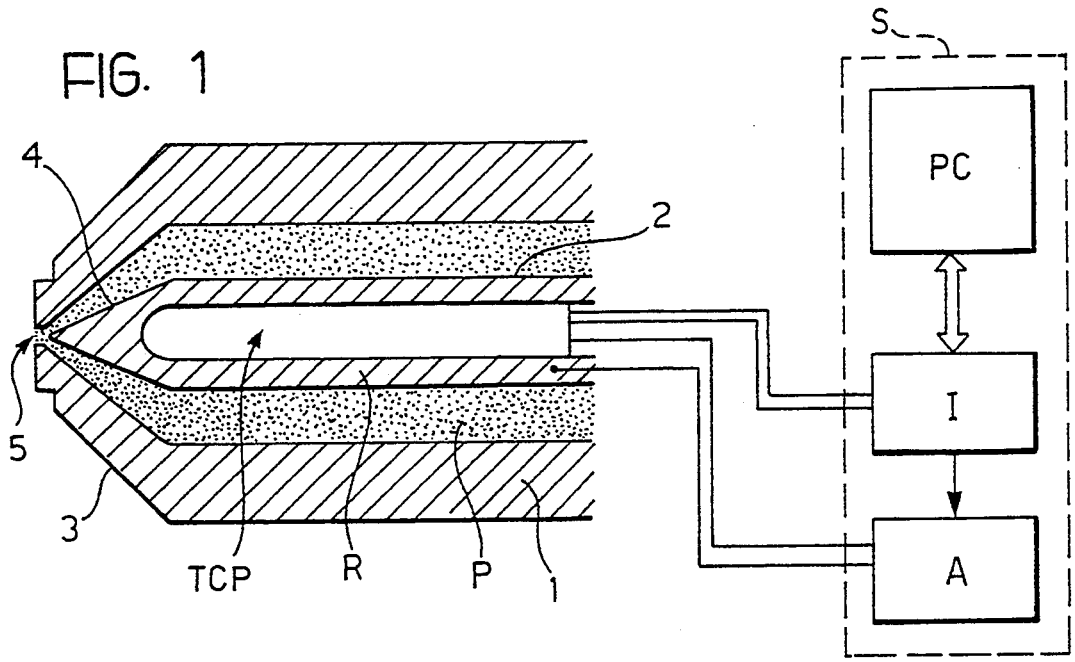
Figure 2:
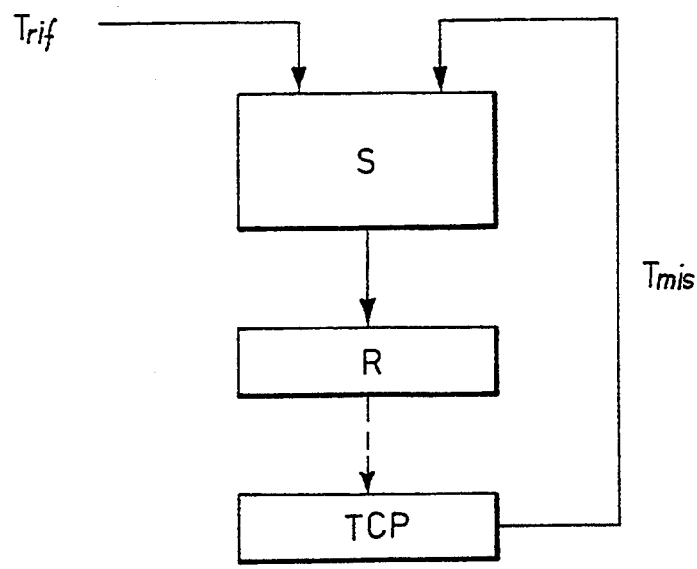
Figure 3:
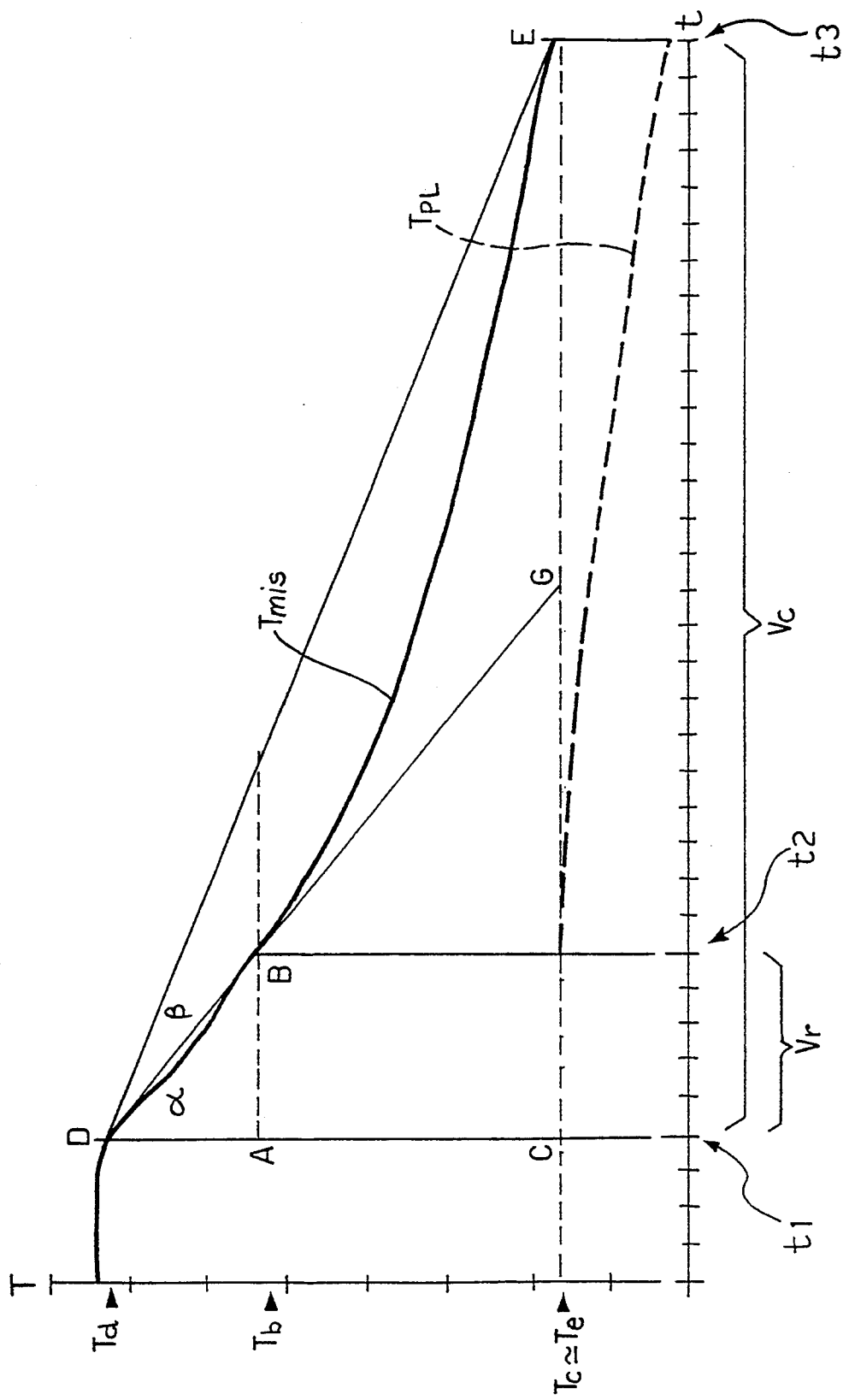
Figure 4:
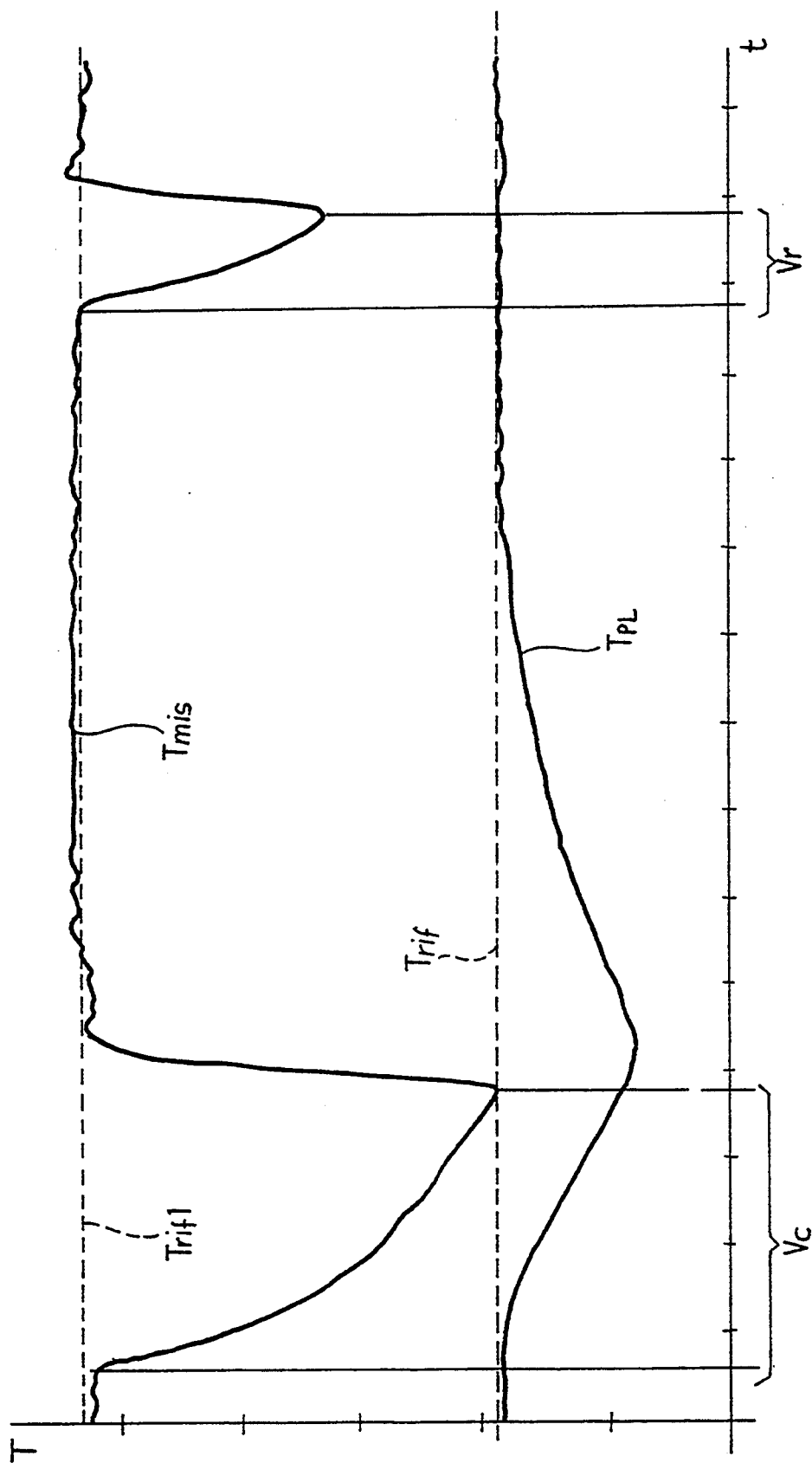

Further advantages and features of the present invention will become apparent from the following detailed description produced with reference to the attached drawings, which are provided purely by way of non-limiting example, and in which:

FIGS. 1 and 2 have already been described with reference to the known art;

FIG. 3 is a graph showing a principle of the method according to the present invention; and FIG. 4 is a graph showing some stages of the method according to the present invention.

The method according to the present invention can be applied for example to injection systems such as the one already described with reference to FIG. 1, in other words to injection systems having injectors of which the torpedo 2 contains the heating resistor R and the thermocouple TCP for measuring the temperature.

The object of the method according to the present invention is to control the temperature with reference to the temperature of the plastics P and not to that inside the torpedo 2.

The principle of use of the method according to the present invention is now described with reference to FIG. 3.

It was found in the course of experiments that if the power distributed to the heating resistor R is interrupted after a substantially constant period of time, the temperature inside the torpedo Tmis, which is measured by the thermocouple TCP, reaches the actual temperature Tpl inside the plastics, at the moment when distribution of power to the heating resistor was interrupted.

Owing to the small size of the torpedo and to its low thermal inertia, this period of time is limited, for example for a typical injector 30 seconds are needed in order to measure a temperature which is substantially identical to that which exists in the plastics at the moment when the heating is interrupted.

This phenomenon is shown in FIG. 3 on a cartesian graph in which the vertical axis represents the temperature T, and the horizontal axis represents the time t. The temperature measured by the thermocouple, which thus coincides substantially with the temperature of the torpedo, is designated Tmis, and the actual temperature inside the plastics P is designated Tpl.

The length of time for which the supply to the resistor is interrupted extends from the moment t1 to t3 and is designated Vc. The temperature Tmis measured by the thermocouple during this time goes from the value Td measured at point D, corresponding to the moment t1, to the value Te measured at point E, corresponding to the moment t3 and substantially the same as the value Tc of point C of the actual temperature TD1 in the plastics at the moment t1. The gradient of the descending temperature curve inside the torpedo Tmis depends on the thermal dispersion of the injector, which in turn is dependent on various factors, such as for example the:

difference between the inner temperature and the ambient temperature:
thermal conductivity of the molten plastics:
thermal conductivity of the torpedo material.

The duration of the period of waiting depends on the thermal inertia of the injection system, which in turn is dependent almost entirely on the mass of the torpedo. As already said, for most injectors this time is approximately 30 seconds.

It has been found however that it is not necessary to wait for 30 seconds in order to determine the actual temperature inside the plastics, since this can be calculated by means of extrapolation. As can be seen from the graph in FIG. 3, if the supply to the resistor R is interrupted for a period of time Vr which lasts for a time t1–t2 shorter than the period Vc required for physical measurement of a temperature which is the same as the temperature Tc to be ascertained, the temperature difference is measured instead between point D and point B, that is, the difference between the temperature Td at the moment t1 and the temperature Tb at the moment t2.

For a period Vr, the ratio between the angles $\alpha$ and $\beta$ is constant, and since the section CE, which is the length of the said constant time Vc, is a known factor, all the information required is available in order to extrapolate the temperature Tc in the plastics at the moment when the distribution of power is interrupted.

If the straight line DB is extended, a point G is obtained which is determined by intersection with the straight line CE. A point A is also found, which corresponds to the temperature Tb on the section DC. Owing to the similarity between the triangles ABD and CGD, the following ratio applies:

$$AB/CG = DA/DC.$$

The difference between the inner temperature Td end that in the plastics Tc, ie the section DC, is equal to:

$$DA * CG/AB$$

DA and AB are known since they are measured, and CG can be obtained from CE which is known, since the angle $\alpha$ and the ratio between the angle $\alpha$ and the angle $\beta$ are known. It is thus possible to calculate the coefficient:

$$CG/AB,$$

which enables the actual temperature to be calculated from the temperature read, after an interval Vr, since it coincides with the coefficient:

$$DC/DA.$$

In theory it would be sufficient to extend the straight line DB for one second, however this would give rise to insufficient accuracy of the value DC extrapolated, and it is therefore advisable to wait for 15% to 30% of the total time, which is typically 5 to 10 seconds, in order to extrapolate the actual temperature inside the plastics.

If the information thus obtained by extrapolating the actual temperature is used, the servocontrol process of the resistor R can be adjusted so as to compensate accurately for the difference between the temperature measured and the actual temperature. In other words, the servocontrol algorithm is modified in such a manner that it maintains the resistor and the torpedo at a temperature (Trif1 in FIG. 4) other than the optimum temperature Trif for the plastics. This compensates accurately for the thermal gradient between the thermocouple inserted in the torpedo 2 and the plastics P, thus ensuring that the temperature in the plastics is maintained at the optimum value.

The method according to the invention can also advantageously modify the reference temperature Trif1 for the thermocouple during production, since the said thermal gradient is not constant in time, but can vary according to the working conditions.

The parameters of the servocontrol algorithm can also be modified such that its performance is optimised. In fact if the said information obtained by extrapolation is always used, the reactions of the injection system can be compensated not only in a steady state but also in the transient states. In other words it is possible to determine the reaction time of the injection system relative to the heat provided by the heating resistor. By this means the parameters of the servocontrol algorithm can be modified so that it responds quickly to temperature variations, without however giving rise to dangerous "overshoots". It is thus possible to ensure that the temperature is as stable as possible during the most critical stages of the production cycle.

As already said, the most common systems use an algorithm known as PID, which is an acronym for the parameters:

Proportional: this establishes the ratio between error and reaction (in terms of gain of the error amplifier);

Integral: this establishes the general response speed of the regulator;

Derivative: this establishes the error response time.

In regulating systems according to the known art, these parameters are fixed: they can be set by means of selector switches or from a keyboard, and are valid for all conditions of the system.

The algorithm used for the method according to the present invention is similar to a conventional PID algorithm, with the difference that the value of these parameters is not fixed, but as already said, varies according to changes in the injector conditions. For example during the stage of starting up (from cold), the derivative factor is at zero per cent, whereas after a pause in order to control the temperature, it is at one hundred per cent. Furthermore the normal regulating cycle includes calculation intervals which however do not interfere with the stability of the temperature.

According to a further advantageous aspect of the temperature-controlling method according to the present invention, the duration of the intervals in which distribution of the power is suspended in order to check the actual temperature Tpl, is not constant, but depends on the initial temperature drop after distribution of the power has been interrupted. In fact after this interruption, the system immediately begins to extrapolate the actual temperature in the plastics, although at a low level of accuracy.

Thus, even though only approximately, the system measures the difference between the real temperature Tpl and the optimum temperature Trif. If this difference is considerable, the system prolongs the interruption of the distribution of power (which hereinafter will be known as the checking interval) t1-t2 in order to obtain greater accuracy of extrapolation and to correct the servocontrol algorithm parameters. Ultimately the checking interval has a duration t1-t3, in order to obtain the greatest possible accuracy from the system.

If however the difference is slight, the system reduces the duration of the checking interval, since this implies that the servocontrol algorithm is following accurately the reference temperature Trif, and is correctly adjusted. Ultimately, the checking interval has a minimum duration t1-t2, for example 10% of the complete interval t1-t3, which as already seen, lasts for a few seconds. This keeps to a minimum the otherwise limited temperature drops in the plastics caused by the checking intervals, when the system is in a steady state.

This situation is shown in FIG. 4, in which the same reference numbers and letters have been used in order to identify elements which are identical or similar to FIG. 3. By way of example, FIG. 4 shows two checking intervals of different durations, in other words a full checking interval Vc and a reduced checking interval Vr, of which the duration is about a third that of the full interval Vc.

According to a further advantageous aspect of the method according to the present invention, the time intervals which separate the checking intervals from one another are also not constant, but vary according to the conditions of the system.

In fact the system continually measures the power distributed to the resistor, which is determined by the servocontrol algorithm. Under normal, steady state conditions, the power distributed is almost constant. Under these conditions the system typically applies short checking intervals which are separated by long periods of time.

If there is a variation in the system conditions, in order to maintain the stability of the temperature of the torpedo which contains the thermocouple, the servocontrol algorithm promptly alters the power distributed to the resistor. The system measures this variation in the power distributed and if the variation exceeds a predetermined threshold value, it implements a checking interval.

By this means, if sudden variations occur in the working conditions, the system re-checks the actual temperature Tpl and, if necessary adjusts the parameters of the servocontrol algorithm in order to adapt it to the altered conditions. The system thus reacts promptly and efficiently even to sudden variations in the working conditions.

In experiments carried out, the method according to the present invention and the system which applies it have provided excellent, results. The accuracy in controlling the actual temperature in the plastics is approximately 1%, and the system reacts promptly and without overshoot even to sudden variations of state. The preceding description shows that the method according to the invention constitutes a particularly advantageous innovative temperature-controlling method.

Although the method and system described here have been designed specifically for use in injection systems for thermoplastics materials, the application thereof is not limited absolutely to this specific field.

Naturally, provided that the principle of the invention is maintained, the details of embodiment and forms of implementation may be varied widely in comparison with those described and illustrated, for example as far as replacement of the PID servocontrol algorithm with algorithms of a different type is concerned, or concerning the number and position of the sensors intended to measure the temperature, without however departing from the scope of the present invention.

We claim:

1. A method for controlling the temperature of a material processed in a system comprising means for heating the material, thermometric measuring means for generating a signal which indicates a temperature in at least one predetermined location of the system in heat transmission relationship to said material and processing means connected in use to the thermometric means and to the heating means, in order to control the functioning of the heating means according to the signal generated by the thermometric means, comprising the steps of:

setting a reference temperature for the material on the processing means;

de-activating the heating means intermittently while the system is functioning;

using the thermometric means to measure the temperature in said at least one predetermined location of the system at a specific moment after the heating means has been de-activated, the temperature measured at the specific moment being indicative of a corresponding temperature in the material; and controlling the heating means in order to cancel the difference between the reference temperature and the temperature of the material.

2. A method according to claim 1, wherein after the heating means has been de-activated, the specific moment is a moment of a final time of a period of de-activation of a predetermined duration, and the temperature measured in said at least one predetermined location is substantially identical to the temperature in the material when the heating means is de-activated.

3. A method according to claim 2, wherein the predetermined duration of the period of de-activation has a constant value characteristic of the system and of the material processed.

4. A method according to claim 3, comprising the preliminary operation of measuring experimentally for the system and for the material processed the value of the predetermined duration of the period of de-activation.

5. A method according to claim 4, wherein the temperature in the material when the heating means is de-activated is dependent on:

the temperature measured in said at least one predetermined location at the specific moment;

a temperature measured in said at least one predetermined location when the heating means is de-activated;

a duration of a variable time interval between de-activation of the heating means and the specific moment, the heating means continuing to be de-activated at least until the specific moment;

the predetermined duration measured experimentally; and a factor of proportionality which is dependent on the variable time interval, and is calculated at the end of the variable time interval.

6. A method according to claim 5, wherein the factor of proportionality is relative to two velocities of variation of the temperature measured in said at least one predetermined location, these two velocities of variation being relative to the period of de-activation of a predetermined, constant duration, and to the variable time interval.

7. A method according to claims 5 and 6, wherein the factor of proportionality is measured experimentally for a plurality of durations of the variable time interval.

8. A method according to claims 5 to 7, wherein the temperature in the material is calculated repeatedly at a plurality of the specific moments in the variable time interval.

9. A method according to claim 8, wherein an overall duration of the variable time interval in which the heating means is de-activated is dependent on differences between the temperature calculated repeatedly in the plurality of specific moments in the variable time interval, and the reference temperature.

10. A method according to claim 1 and claims 5 to 8, wherein the temperature in the material is calculated by the processing means.

11. A method according to claim 1, comprising the steps of:

calculating an additional reference temperature;

calculating an additional difference between the temperature measured and the additional reference temperature; and controlling the heating means in order to eliminate the additional difference, for the purpose of eliminating any difference between the reference temperature and a temperature in the material.

12. A method according to claim 11, comprising the step of calculating the additional reference temperature at the end of the periods of de-activation of a predetermined, constant duration, and at the end of the intervals of de-activation of variable duration.

13. A method according to claim 6, comprising the steps of:

measuring the power distributed to the heating means;

calculating the difference between the power measured and a predetermined reference power;

if the power difference exceeds a predetermined threshold value, de-activating the distribution of power to the heating means for one of the time intervals in order to determine the temperature in the material.

14. A method according to claim 12, wherein the predetermined reference power is an average of the power distributed to the heating means during a specific time interval.

15. A method according to claim 1, wherein the material is a plastics material.

16. A method according to claim 15, wherein the system is an injection system and said at least one predetermined location in the system is a torpedo of an injector.

17. A system for processing a material comprising:

means for heating the material;

thermometric measuring means which generate a signal indicative of a temperature measured in at least one point of the system, in heat transmission relationship to said material; and processing means connected in use to the thermometric means and to the heating means;

wherein the processing means is configured to control functioning of the heating means in accordance with the signal generated by the thermometric means according to the steps of:

setting a reference temperature for the material on the processing means;

de-activating the heating means intermittently while the system is functioning;

using the thermometric means to measure the temperature in said at least one point of the system at a specific moment after the heating means has been de-activated, the temperature measured at the specific moment being indicative of a corresponding temperature in the material; and controlling the heating means in order to cancel the difference between the reference temperature and the temperature of the material.

18. A system according to claim 17, wherein after the heating means has been de-activated, the specific moment is a moment of a final time of a period of de-activation of a predetermined duration, and the temperature measured in said at least one predetermined is substantially identical to the temperature in the material when the heating means is de-activated.

19. A system according to claim 18, wherein the predetermined duration of the period of de-activation has a constant value characteristic of the system and of the material processed.

20. A system according to claim 19, comprising means adapted to execute the preliminary operation of measuring experimentally for the system and for the material processed the value of the predetermined duration of the period of de-activation.

21. A system according to claim 20, wherein the temperature in the material when the heating means is de-activated is dependent on:

the temperature measured in said at least one predetermined location at the specific moment;

a temperature measured in said at least one predetermined location when the heating means is de-activate;

a duration of a variable time interval between de-activation of the heating means and the specific moment, the heating means continuing to be de-activated at least until the specific moment;

the predetermined duration measured experimentally; and a factor of proportionality which is dependent on the variable time interval, and is calculated at the end of the variable time interval.

22. A system according to claim 21 wherein the factor of proportionality is relative to two velocities of variation of the temperature measured in said at least one predetermined location, these two velocities of variation being relative to the period of de-activation of a predetermined, constant duration, and to the variable time interval.

23. A system according to claims 21 and 22, wherein the factor of proportionality is measured experimentally for a plurality of durations of the variable time interval.

24. A system according to claims 21 to 23, wherein the temperature in the material is calculated repeatedly at a plurality of the specific moments in the variable time interval.

25. A system according to claim 24, wherein an overall duration of the variable time interval in which the heating means is de-activated is dependent on differences between the temperature calculated repeatedly in the plurality of specific moments in the variable time interval, and the reference temperature.

26. A system according to claim 17 and claims 21 to 24, wherein the temperature in the material is calculated by the processing means.

27. A system according to claim 17 comprising:

means for calculating an additional reference temperature;

means for calculating an additional difference between the temperature measured and the additional reference temperature: and means for controlling the heating means in order to eliminate the additional difference, for the purpose of eliminating any difference between the reference temperature and a temperature in the material.

28. A system according to claim, 27, comprising means adapted to calculate the additional reference temperature at the end of the periods of de-activation of a predetermined, constant duration, and at the end of the intervals of de-activation of variable duration.

29. A system according to claim 22 comprising:

means for measuring the power distributed to the heating means;

means calculating the difference between the power measured and a predetermined reference power, said calculating means being adapted in such a way that if the power difference exceeds a predetermined threshold value, de-activating the distribution of power to the heating means for one of the time intervals in order to determine the temperature in the material.

30. A system according to claim 28, wherein the predetermined reference power is an average of the power distributed to the heating means during a specific time interval.

31. A system according to claim 17, wherein the material is a plastics material.

32. A system according to claim 31 wherein the system is an injection system.

33. A system according to claim 32, wherein said at least one point in the injection system is a torpedo of an injector.

* * * * *